(No Model.)

M. SCHALSCHA.
ELECTRIC SWITCH.

No. 576,621. Patented Feb. 9, 1897.

WITNESSES:
C. Neveux
C. R. Ferguson

INVENTOR
M. Schalscha
BY
ATTORNEYS

UNITED STATES PATENT OFFICE.

MAXIMILIAN SCHALSCHA, OF HOBOKEN, NEW JERSEY.

ELECTRIC SWITCH.

SPECIFICATION forming part of Letters Patent No. 576,621, dated February 9, 1897.

Application filed February 20, 1896. Serial No. 580,068. (No model.)

*To all whom it may concern:*

Be it known that I, MAXIMILIAN SCHALSCHA, of Hoboken, in the county of Hudson and State of New Jersey, have invented certain new and useful Improvements in Electric Switches, of which the following is a full, clear, and exact description.

This invention relates to electric switches, and more particularly to switches for automatically regulating the current through a motor, so as to gradually increase or diminish the speed.

The main object of my invention is to provide a simple and automatic means for controlling a motor on a transporting-car, such, for instance, as the transporting-car described and claimed by me in an application for patent filed by me under even date herewith.

I will describe a switch embodying my invention and then point out the novel features in the appended claims.

Reference is to be had to the accompanying drawings, forming a part of this specification, in which similar characters of reference indicate corresponding parts in all the figures.

Figure 1:
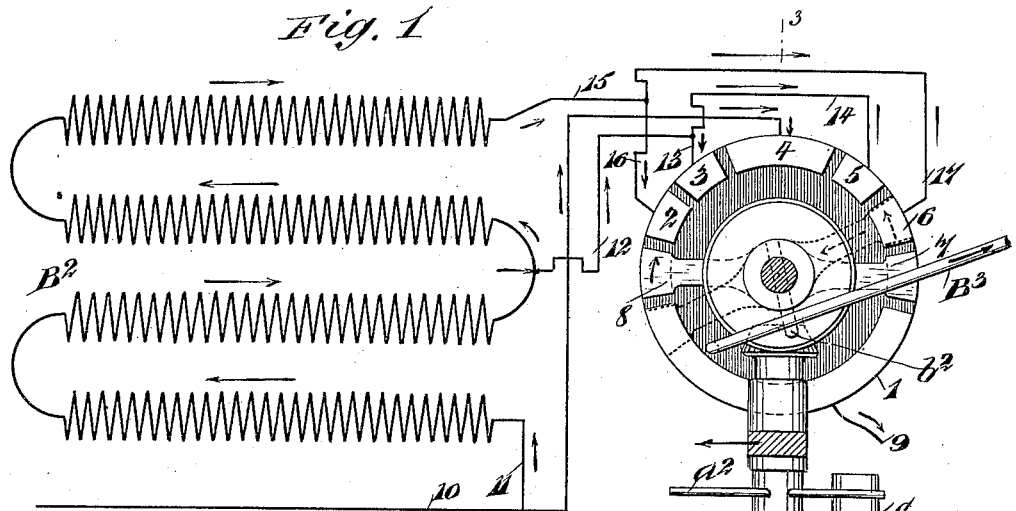
Figure 3:
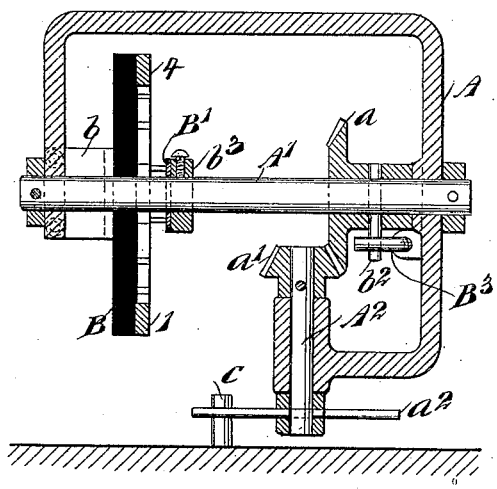
Figure 2:
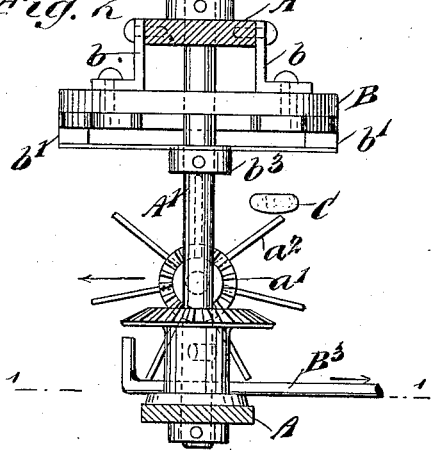
Figure 4:
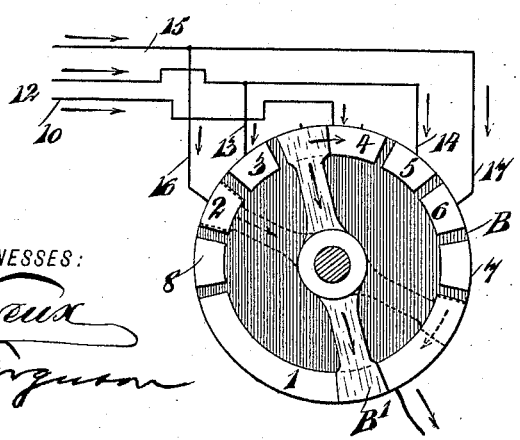

Figure 1 is an elevation and partial section, on the line 1 1 of Fig. 2, of a switch mechanism embodying my improvement. Fig. 2 is a top plan view thereof. Fig. 3 is a section on the line 3 3 of Fig. 1; and Fig. 4 is a face view of the switch, showing the parts in position for a full current to a motor.

Referring to the drawings, A designates a supporting-frame designed to be secured to a fixed part, such, for instance, as a car, in a position adjacent to the motor. Having bearings in the frame A is a horizontal shaft $A'$, upon which is mounted a bevel-gear $a$, meshing with a bevel-gear $a'$ on a shaft $A^2$, supported vertically in said frame A, and the lower end of the vertical shaft $A^2$ is provided with a series of radial arms $a^2$, which are here shown as extended horizontally to engage with projections on a track-bed, as will be hereinafter described.

The switch comprises a disk B, of insulating material, rigidly secured to arms $b$, extended from the frame A. On the front face of the disk B are mounted a number of segmental contact-plates 1, 2, 3, 4, 5, and 6 and two oppositely-disposed inactive plates 7 and 8. The arc of the plate 1 is substantially equal to the combined arcs of the plates 2, 3, 4, 5, and 6, and said plate 1 is arranged opposite the said shorter plates, so that when one end of a switch-arm $B'$ is in engagement with either one of said shorter plates its other end will be in engagement with the plate 1 to close the circuit. The plate 4 is double the length of either of the plates 2, 3, 5, and 6 and its function will be hereinafter made clear.

A main-line wire 9 leads from the plate 1 to one pole of the motor, and from the other pole of the motor a main wire 10 leads to the plate 4.

$B^2$ is a rheostat or resistance having, as shown, four coils arranged in pairs, and the first coil has connection through a shunt-wire 11 with the main wire 10. The several coils are connected together in the usual manner, and from the second coil a shunt-wire 12 leads to connections 13 and 14 with the respective plates 3 and 5, and from the last coil a shunt-wire 15 leads to connections 16 and 17 with the respective plates 2 and 6. By this arrangement it will be seen that a full current, or a current having the least resistance, will be transmitted through the plate 4, that the plates 3 5 will present a greater resistance, and that the plates 2 6 will present a still greater resistance. In this way it will be seen that the contact-plates 2 to 8, inclusive, on the disk B are arranged in two groups or series, one group comprising the plates 8, 2, and 3 on one side of the central plate 4 and the other group or series comprising the plates 7, 6, and 5 on the other side of the central plate 4, and it will be seen that the plates 2 and 6 and 3 and 5 being connected by the wires 16 17 and 13 14, respectively, with similar coils of the rheostat, no matter which way the switch-arm $B'$ is moved the resistance placed in the motor-circuit will be the same.

The switch-arm $B'$ is rigidly fastened to the shaft $A'$, so as to rotate therewith. It is here shown as in yielding-plate form and secured to a collar $b^3$, of insulating material, secured by a set-screw to the shaft, and the opposite ends of the arm are provided with blocks $b'$, designed to engage with the contact-plates on the disk B.

$B^3$ is a shifting rod adapted for longitudinal movement and having a hook end designed to engage with a pin $b^2$, extended from the hub of the gear $a$, and rotate the shaft A' to move the switch-arm from the inactive plates 7 and 8 into engagement with the plates 6 and 1, in order to automatically turn on the initial current to start a car on its return journey. This shifting rod and its operating mechanism are fully described and claimed in my application above referred to, and therefore do not form a material part of this application.

The arms $a^2$ are designed to engage with a series of projections from the track-bed at the starting-station of a car in order to gradually turn on the current to its full power and also to engage with similar projections at the terminal station of the car to gradually cut off the current. One of these projections is shown at C in the drawings.

The operation of the device is as follows: Assuming that the switch is employed for controlling a motor on a car, while the car is being loaded the switch-arm will be in engagement with the inactive plates 7 and 8 on the disk B. In starting the car an attendant will shift the arm into engagement with the plates 1 and 2, so that sufficient current flows through the motor to move the car. As the car moves along, one of the arms $a^2$ will engage with a projection C and move the switch-arm into engagement with the plate 3, so that a greater amount of current will flow through the motor and impart a greater speed to the car. Then an arm $a^2$ will engage with another projection C and move the arm into engagement with one end of the plate 4, and then an arm $a^2$ will engage another projection C and move the switch-arm into engagement with the opposite end of the plate 4. While the arm is in engagement with the plate 4 a full current will be turned on, and the car, unattended, will proceed to its destination under full speed. As the car approaches its terminal station an arm $a^2$ will engage with a projection C and shift the switch-arm into engagement with the plate 5. Then an arm $a^2$, engaging with another projection, will move the switch-arm into engagement with the plate 6, and then an arm $a^2$, engaging with another projection C, will move the switch-arm into engagement with the plates 7 and 8, thus gradually reducing and finally cutting off the electric current. In order to start the empty car on its return trip, the current will be automatically reversed through the fields of the motor, and the initial current will be turned on by shifting the switch-arm into engagement with the plates 1 and 2 through the medium of the rod B³, operated in the manner set forth in the application heretofore referred to.

Having thus fully described my invention, I claim as new and desire to secure by Letters Patent—

1. A switch adapted to be carried by a moving device to regulate the current through a motor for said moving device, comprising a switch in the electric circuit and having a series of contact-plates, a switch-arm for closing the circuit through the plates, a rotary shaft on which said arm is mounted, a rotary shaft having gear connection with the arm-carrying shaft, and arms extended radially from the last-named shaft, substantially as specified.

2. The combination of a switch device adapted to be carried on a car to control the motor thereof and comprising series of contacts and a switch-arm to play on the same, a shaft also adapted to be carried on the car and having an arm, pins located on the track in the path of said arms and arranged to engage and move the same, and gearing between the shaft and the contact-arm to drive the latter from the former, substantially as set forth.

3. The combination of a rheostat adapted to be carried on a car and having a series of coils or equivalent devices, a switch device also adapted to be carried on the car and comprising a part having contact-plates and a switch-arm to traverse said plates, a circuit connection for the switch-arm, the other contact-plates of the switch device being formed into correspondingly-arranged series and similarly-located plates in the respective series being similarly connected to the coils of the rheostat and arranged to place said coils in circuit with the motor on the car whereon the device is carried, a shaft geared to the switch-arm and provided with arms, and pins located along the track in the path of the arms on the shaft, to turn the shaft and actuate the switch device, substantially as set forth.

MAX. SCHALSCHA.

Witnesses:
A. A. HOPKINS,
C. R. FERGUSON.